United States Patent Office 3,040,024
Patented June 19, 1962

3,040,024
AZO-DYESTUFFS
Henri Riat, Arlesheim, and René de Montmollin and Karl Seitz, Neualischwil, Switzerland, assignors to Ciba Limited, Basel, Switzerland
No Drawing. Filed Mar. 3, 1958, Ser. No. 718,478
Claims priority, application Switzerland Mar. 7, 1957
8 Claims. (Cl. 260—196)

This invention provides azo-dyestuffs which like, for example, the monoazo-dyestuff of the formula (1)

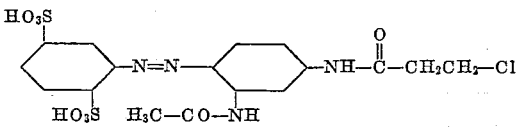

correspond to the formula (2) $R_1$—N=N—$R_2$—NH—CO—$CH_2CH_2$-Halogen in which $R_1$ represents an at most bicyclic aromatic radical of a diazo-component which may contain an azo group and which contains at least one sulfonic acid group for each aromatic 6-membered ring, and $R_2$ represents a benzene radical bound in the 4-position to the —NH— group and in the 1-position to the azo linkage.

The invention also provides a process for the manufacture of the dyestuffs of the above Formula 2, wherein an amino-azo-dyestuff of the formula (3)         $R_1$—N=N—$R_2$—$NH_2$ in which $R_1$ and $R_2$ have the meanings given above, is acylated at the amino group by means of an anhydride or halide of a $\beta$-halogen-propionic acid. As anhydrides or halides there are used more especially those of $\beta$-bromo- of $\beta$-chloro-propionic acid.

The amino-azo-dyestuffs of the Formula 3 can be obtained by coupling a diazotized aromatic amino-sulfonic acid, which contains at least one sulfonic acid group for each aromatic 6-membered ring, with an amino-benzene which contains a primary amino group.

Accordingly, there are used for making the amino-azo-dyestuffs of the Formula 3 diazo-components, for example, those of the benzene or naphthalene series, which may contain an azo group and contain at least one sulfonic acid group per aromatic 6-membered ring and may contain further substituents, for example, halogen atoms such as chlorine, or methoxy or ethoxy groups, or nitro or acylamino groups. Owing to the ease with which they can be obtained and the good results produced therewith there are used more especially mono- or di-sulfonic acids of aminobenzene, for example, 1-aminobenzene-2-, -3- or -4-sulfonic acid, 3-amino-2-hydroxybenzoic acid 5-sulfonic acid, 5-amino-2-hydroxybenzoic acid-3-sulfonic acid, 2-aminobenzoic acid-4- or -5-sulfonic acid or 1-aminobenzene-2:5-disulfonic acid, 4-$\beta$ - chloropropionylamino-1-aminobenzene-2-sulfonic acid, 4 - chloroacetylamino-2-aminobenzene-1-sulfonic acid, disulfonic acids of amino-azo-benzene, for example, 4-amino-1:1'-azo - benzene- 3:4'-disulfonic acid, and also the disulfonic acid of the formula

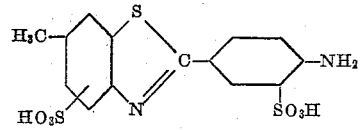

which is obtained by thermal rearrangement of the acid sulfate of the monosulfonic acid obtainable by the sulfonation with concentrated sulfuric acid of 2-(4'-aminophenyl)-6-methyl-benzthiazole, and advantageously α- or β-naphthylamine disulfonic acids, such as 1-aminonaphthalene-3:6-disulfonic acid or 2-aminonaphthalene-3:6-, -5:7-, -4:8- or -6:8-disulfonic acid.

For coupling with the aforesaid diazo-components containing sulfonic acid groups there are used aminobenzenes which owe their capacity for coupling to the presence of a primary amino group. They may contain further substituents, for example, lower alkyl or alkoxy groups, such as methyl, ethyl, methoxy or ethoxy groups.

As examples of such aminobenzenes there may be mentioned for example, the following primary amines: Aniline, ortho- or meta-toluidine, 2:5-dimethylaniline, ortho- or meta-anisidine, 2 - methoxy-5-methylaniline, 2:5-dimethory- or 2:5-diethoxy-aniline. There are advantageously used those 1-aminobenzenes which contain in the 3-position an acylamino group, advantageously an acylamino group derived from a carboxylic acid, and above all from an aliphatic carboxylic acid of low molecular weight, for example, a formylamino-, acetylamino-, propionylamino-, hydroxyacetylamino-, hydroxypropionylamino-, carbalkoxyamino- or $H_2N$—CO—NH-group. Thus, for example, there are advantageously used 1-amino-3-acylaminobenzenes of the formula (4)

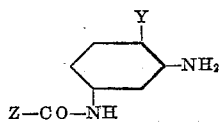

in which Y represents a hydrogen atom or an alkyl or alkoxy group of low molecular weight, and Z represents a methyl, ethyl, methoxy or ethoxy group or a hydroxymethyl group or a primary amino group. As examples of 1-amino-3-acylaminobenzenes of the Formula 4 there may be mentioned:

1-amino-3-acetylaminobenzene,
1-amino-3-propionylaminobenzene,
1-amino-3-($\beta$-chloropropionyl)-aminobenzene,
1-amino-3-hydroxyacetylaminobenzene,
1-amino-3-acetylamino-6-methoxybenzene,
1-amino-3-acetylamino-6-methylbenzene,
(3-aminophenyl)-urea,
(3-amino-4-methoxyphenyl)-urea and
1-amino-3-carbomethoxy- or -carboethoxyaminobenzene.

These aminobenzenes may be coupled with the aforesaid diazo-components containing sulfonic acid groups by a method in itself known, advantageously in a weakly acid to neutral medium, for example, in an acetic acid medium.

The acylation of the dyestuffs of the Formula 3 with a $\beta$-halogen-propionic anhydride or $\beta$-halogen-propionic acid halide, for example, with $\beta$-chloropropionyl chloride, is advantageously carried out in the presence of an acid-binding agent, such as sodium acetate or sodium carbonate. The acylation is carried out in such manner that the acylation product obtained contains the halogen atom of the halogen-propionyl radical, for example, by reacting one molecular proportion of an amino-azo-dyestuff of the Formula 3, with at least one molecular proportion of the anhydride or halide in a weakly acid, neutral to weakly alkaline medium and/or at as low a temperature as possible.

Notwithstanding the presence of a labile halogen atom the dyestuffs of this invention can be isolated from the medium in which they are produced, for example, by salting out and filtration and can be worked up into useful dry dyestuff preparations. The isolation is advantageously carried out by salting out and filtration at as low a temperature as possible. The isolated dyestuffs may be dried, if desired, after the addition of a neutral or very weakly alkaline extender. The drying should not be carried out at too high a temperature, and may be carried out under reduced pressure. Dry preparations can be obtained in certain cases by spray drying the entire mixture in which the dyestuff is produced, that is to say, without first isolating the dyestuff.

The new azo-dyestuffs of the general Formula 2 advantageously contain at least two groups imparting solubility in water.

The new dyestuffs are suitable for dyeing and printing a very wide variety of materials, such as animal textile materials or materials containing superpolyamides, and especially cellulosic fibrous materials, such as linen, regenerated cellulose, staple fibers of regenerated cellulose, and above all cotton, and also synthetic artificial fibers of viscose or of polyvinyl alcohol. The dyestuffs are especially suitable for dyeing cellulose by methods in which the dyestuff, after being applied to the material to be dyed by the direct dyeing method, the so-called pad dyeing method or a printing method, is fixed on the material, for example, by means of an acid-binding agent and a heat treatment.

The dyeings produced on cellulosic fibers with the dyestuffs of this invention are usually distinguished by the purity of their tints, by their good fastness to light and above all by their excellent fastness to washing.

The following examples illustrate the invention, the parts and percentages being by weight unless otherwise stated, and the relationship of parts by weight to parts by volume being the same as that of the kilogram to the liter:

*Example 1*

46.4 parts of the dyestuff from diazotized 2-aminonaphthalene-4:8-disulfonic acid and 3-acetylamino-1-aminobenzene are dissolved in 400 parts of water and 30 parts by volume of a 2 N-solution of sodium carbonate, and 40 parts by volume of a 5 N-solution of β-chloropropionyl chloride in toluene are added in portions at 20–25° C. The reaction mixture is maintained weakly acid to weakly alkaline by the gradual addition of a 2 N-solution of sodium carbonate. 110 parts of sodium chloride, and, if necessary, a small amount of hydrochloric acid, are added to the reaction mixture. The precipitated dyestuff is filtered off and dried in vacuo at 40–50° C. The dyestuff is an orange-red powder of the formula

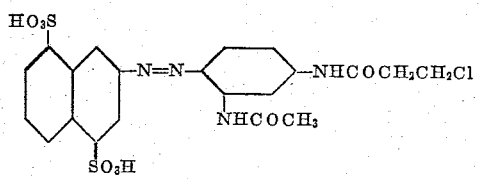

which dissolves in water and dyes cotton by the process described in Example 3, reddish-yellow tints which are fast to light and of excellent fastness to washing. The dyestuff also dyes wool, for example, from an acetic acid bath, fast reddish yellow tints.

By using β-bromopropionyl chloride instead of β-chloropropionyl chloride, there is obtained a dyestuff having similar properties.

In an analogous manner there are obtained by acylating the dyestuffs given in column I of the following Table with chloropropionyl chloride dyestuffs which dye cotton the tints given in column II.

| | I | II |
|---|---|---|
| 1 | 2-Aminonaphthalene-4:8-disulfonic acid ⟶ 3-methyl-1-aminobenzene. | reddish yellow. |
| 2 | 2-aminonaphthalene-4:8-disulfonic acid ⟶ 2-methoxy-5-methylaniline. | Do. |
| 3 | 1-aminobenzene-2:5-disulfonic acid ⟶ 3-acetylamino-1-aminobenzene. | yellow. |
| 4 | 2-aminonaphthalene-4:8-disulfonic acid ⟶ 3-β-chloropropionyl-amino-1-aminobenzene. | reddish yellow. |
| 5 | 2-aminonaphthalene-4:8-disulfonic acid ⟶ 3-aminophenylurea. | Do. |
| 6 | 2-aminonaphthalene-5:7-disulfonic acid ⟶ 3-acetylamino-1-amino-benzene. | Do. |
| 7 | 1-aminonaphthalene-3:6-disulfonic acid ⟶ 2-methoxy-5-methylaniline. | orange yellow. |
| 8 | 2-aminonaphthalene-4:8-disulfonic acid ⟶ 1-amino-3-carbethoxyaminobenzene. | reddish yellow. |
| 9 | 1- aminobenzene-3-sulfonic acid ⟶ aniline. | yellow. |
| 10 | 2-aminonaphthalene-4:8-disulfonic acid ⟶ 1-amino-2-methoxy-benzene. | reddish yellow. |
| 11 | 2-aminonaphthalene-4:8-disulfonic acid ⟶ aniline. | yellow. |

For making the three dyestuffs last mentioned in the above table the said coupling components are used in the usual manner in the form of their ω-methane sulfonic acid derivatives, and, before acylation, the dyestuffs are hydrolyzed in order to liberate the amino group.

*Example 2*

20 parts of the amino-disazo-dyestuff, obtainable by coupling diazotized 4-amino-1:1'-azobenzene-3:4'-disulfonic acid with 3-acetylamino-1-aminobenzene in acetic acid solution, are dissolved in 500 parts of water. To the solution there are added β-chloropropionyl chloride and a dilute solution of sodium carbonate until the free amino group has been completely acylated. The dyestuff obtained by salting out, filtration and drying dyes cotton brown-yellow tints.

*Example 3*

2 parts of the dyestuff obtained as described in Example 1 are dissolved in 100 parts of water. A cotton fabric is impregnated with the solution on a foulard, and the excess liquid is squeezed off until the material retains 75% of its weight of dyestuff solution.

The impregnated material is then dried, impregnated at room temperature with a solution which contains, per liter, 10 grams of sodium hydroxide and 300 grams of sodium chloride, the material is squeezed to a weight increase of 75% and steamed for 60 seconds at 100–101° C. It is then rinsed, treated in a sodium carbonate solution of 0.5% strength, rinsed soaped for ¼ hour in a solution of 0.3% strength of an ion-free detergent at the boil, rinsed and dried. There is obtained a reddish yellow dyeing which is fixed fast to boiling. By using a fabric of staple fibers of regenerated cellulose, instead of a cotton fabric, a similarly good result is obtained.

What is claimed is:

1. An azo-dyestuff which in its free acid state corresponds to the formula

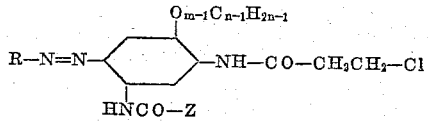

wherein R represents a member of the group consisting of the radical of a benzene sulfonic acid substituted solely by one to two sulfonic acid groups and that of a naphthalene disulfonic acid containing as sole substituents two sulfonic acid groups, Z represents a number selected from the class consisting of the methyl- the methoxy- the ethyl-, the ethoxy, the HO—CH₂— and the H₂N- group, n and m each represent a whole number up to two, m being at most equal to n.

2. The monoazo-dyestuff of claim 1 wherein R represents a naphthalene radical containing as sole substituents two sulfonic acid groups.

3. An azo-dyestuff which contains at most two

—N=N— groups and which in its free acid state corresponds to the formula

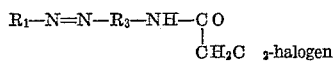

wherein R₁ represents the radical of a diazo component selected from the group consisting of a benzene sulfonic acid radical and a naphthalene radical containing as sole substiutents two sulfonic acid groups, all the —N=N— groups being in the R₁—N=N-moiety, and R₃ represents a benzene radical bound to the —NH— group in 1-position and to the —N=N— bridge in 4-position.

4. A monoazo-dyestuff which in its free acid state corresponds to the formula

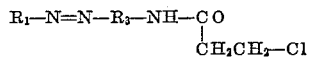

wherein R₁ is the radical of a diazo component consisting of a benzene radical substituted solely by one to two sulfonic acid groups, and R₃ is a benzene radical bound to the —NH— group in 1-position and to the —N=N— bridge in 4-position.

5. A monoazo-dyestuff which in its free acid state corresponds to the formula

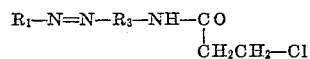

wherein R₁ is the radical of a diazo component consisting of a naphthalene radical containing as sole substituents two sulfonic acid groups, and R₃ is a benzene radical bound to the —NH— group in 1-position and to the —N=N— bridge in 4-position.

6. The monoazo-dyestuff which in its free acid state corresponds to the formula

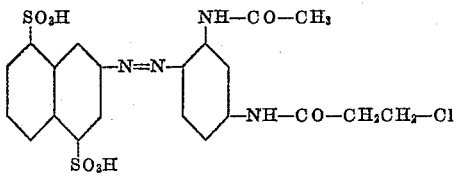

7. The monoazo-dyestuff which in its free acid state corresponds to the formula

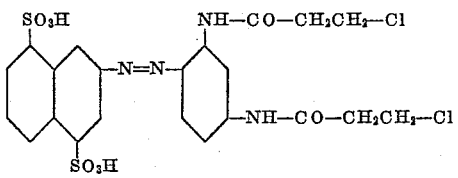

8. The monoazo-dyestuff which in its free acid state corresponds to the formula

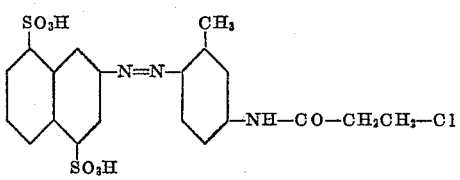

References Cited in the file of this patent

UNITED STATES PATENTS

| | | |
|---|---|---|
| 2,183,489 | Fleischhauer | Dec. 12, 1939 |
| 2,402,538 | Dreyfus | June 25, 1946 |

FOREIGN PATENTS

| | | |
|---|---|---|
| 209,552 | Switzerland | July 16, 1940 |
| 209,554 | Switzerland | July 16, 1940 |
| 779,781 | Great Britain | July 24, 1957 |

OTHER REFERENCES

Guthrie, J. D.: American Dyestuff Reporter, vol. 41, No. 1, January 7, 1952, pages 13, 14 and 30.

UNITED STATES PATENT OFFICE
CERTIFICATE OF CORRECTION

Patent No. 3,040,024                                    June 19, 1962

Henri Riat et al.

It is hereby certified that error appears in the above numbered patent requiring correction and that the said Letters Patent should read as corrected below.

Column 2, line 26, for "methory-" read -- methoxy- --; column 5, line 5, for "number" read -- member --; same column 5, lines 18 to 20, the formula should appear as shown below instead of as in the patent:

Signed and sealed this 4th day of December 1962.

(SEAL)
Attest:

ERNEST W. SWIDER
Attesting Officer

DAVID L. LADD
Commissioner of Patents